Feb. 17, 1942.  N. M. COUTY  2,273,397

SWIVEL HOSE FITTING

Filed April 5, 1941

INVENTOR
Norman M. Couty.
BY
Everett J. Wright
ATTORNEY

Patented Feb. 17, 1942

2,273,397

UNITED STATES PATENT OFFICE 2,273,397

SWIVEL HOSE FITTING

Norman M. Couty, Detroit, Mich., assignor to The Flex-O-Tube Company, a corporation of Delaware Application April 5, 1941, Serial No. 386,980

3 Claims. (Cl. 285—97.5)

This invention relates to swivel couplings for flexible hose and the like.

This invention is an improvement over the invention disclosed and claimed in an application for patent, Serial No. 226,087 filed August 22, 1938, by Norman M. Couty, the applicant herein, which application has matured into U. S. Letters Patent No. 2,172,650 dated September 12, 1939 entitled Male swivel nut connection.

The prior art includes a fitting of the general type disclosed and claimed herein, however, when a fitting such as disclosed and claimed in the said Letters Patent No. 2,172,650 is placed under vacuum, initial compression on the compressible gasket employed is relieved, the fluid seal normally obtained is lost, and leakage results.

The primary object of the instant invention is to provide a fluid-tight swivel coupling usable under both pressure and vacuum which will allow hose or tubing to swivel or rotate with respect to the part to which it is coupled.

Another object of the invention is to provide a simple, inexpensive swivel coupling for connecting flexible hose and the like to a relatively fixed part which will permit the said hose to be used under alternate pressure and vacuum without leakage.

Other objects of the invention will become apparent by reference to the following detailed description taken in connection with the accompanying drawing, in which.

Figure 1:
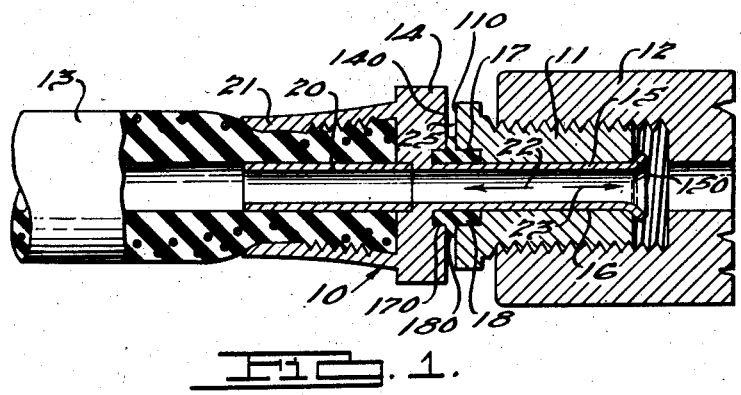
Fig. 1 is a longitudinal sectional view of a swivel fitting embodying the invention.

Referring now to the drawing wherein like numerals refer to like and corresponding parts throughout the several views, the illustrative embodiment of the invention disclosed in Fig. 1 comprises a swivel fitting generally designated by the numeral 10 which is composed of a male nut 11 threadable into a part 12 to which the flexible hose or the like 13 is to be connected, the said flexible hose 13 having a coupling member 14 fixed thereon which has a tubular stem 15 extending therefrom through a suitable bore 16 in the male nut 11. The tubular stem 15 of the coupling member 14 is sufficiently free within the bore 16 of the male nut 11 to permit the coupling member 14 and the flexible hose 13 to which it is connected to swivel with respect to the said male nut 11. The end of the male nut 11 nearest the coupling member 14 is counterbored at 17 and the end of the coupling member 14 nearest the male nut 11 is counterbored at 170, both counterbores 17 and 170 accommodating a compressible annular washer or gasket 18 which has a radial flange 180 extending therefrom which is disposed between the annular face 110 of the male nut 11 and the annular face 140 of the said coupling member 14. The annular washer or gasket 18 is slightly longer than the sum of the depth of the two counterbores 17 and 170 and the thickness of the radial flange 180 thereof.

The extreme end 150 of the tubular stem 15 of the coupling member 14 is flared or peened over after assembly to hold the swivel fitting 10 in assembled relationship and to initially compress the said compressible annular gasket 18 in the counterbores 17 and 170 and to initially compress the radially extending flange 180 thereof between the annular face 110 of the male nut 11 and the annular face 140 of the coupling member 14. The said initial compression of the said annular gasket 18 and its flanges 180 creates a fluid-tight seal between the coupling member 14 and the male nut 11.

Although the hose coupling member 14 is indicated as employing an inner tubular member 20 within the interiorly threaded swedged shell 21 to prevent collapsing of the flexible hose 13 when the shell 21 of the coupling member 14 is swedged onto the said flexible hose 13, it is obvious that any type of coupling means other than that shown may be employed to connect the hose 13 to the coupling member 14.

Fluid under pressure within the fluid system to which the swivel fitting 10, the part 12, and the hose or the like 13 belong causes the hose coupling 14 and its tubular stem 15 to move in the direction indicated by the arrow 22 with respect to the male nut 11. Pressure on fluid from within the said fluid system which might force fluid out through minute space between the outer surface of the tubular stem 15 of the coupling member 14 and the bore 16 through the male nut 11 will tend to urge the compressible annular gasket 18 out through the space 25 between the annular faces 110 and 140 of the male nut 11 and coupling member 14 respectively, however, inasmuch as the annular gasket 18 is longer than the said space 25 between the annular faces 110 and 140 of the male nut 11 and coupling member 14 respectively, the said annular gasket cannot be forced by pressure out through the said space 25, and, the greater the pressure within the fluid system, the tighter the wedging of the flanged annular gasket 18 within the counterbores 17 and 170 and the greater the fluid tightness of the fitting.

If the pressure within the fluid system to which the said swivel fitting 10, the part 12 and the hose or the like 13 belong is changed to vacuum, then the hose coupling 14 and its tubular stem 15 are urged in the direction indicated by the arrow 23 with respect to the male nut 11. This causes the annular faces 110 and 140 of the male nut 11 and the hose coupling 14 respectively to squeeze the radial flange 180 of the gasket 18 therebetween to form a tight seal simultaneously with the further compressing of the annular portion of the said gasket 18 axially which is thereby further expanded radially within the counterbores 17 and 170 in the male nut 11 and coupling member 14 respectively. The more the vacuum within the fluid system, the tighter the squeezing of the flange 180 of the annular gasket 18, the greater the compression axially on the annular gasket 18, and the greater the fluid tightness of the fitting.

Figure 2:
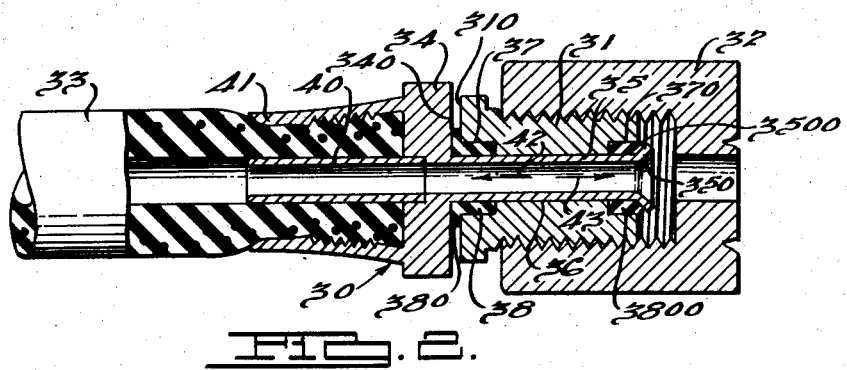
Fig. 2 is a longitudinal sectional view of a second embodiment of the invention.

The illustrative embodiment of the invention disclosed in Fig. 2 comprises a swivel fitting generally designated by the numeral 30 which is composed of a male nut 31 threadable into a part 32 to which the flexible hose or the like 33 is to be connected, the said flexible hose 33 having a coupling member 34 fixed thereon which has a tubular stem 35 extending therefrom through a suitable bore 36 in the male nut 31. The tubular stem 35 of the coupling member 34 is sufficiently free within the bore 36 of the male nut 31 to permit the coupling member 34 and the flexible hose 33 to which it is connected to swivel with respect to the said male nut 31. The end of the male nut 31 nearest the coupling member 34 is counterbored at 37 and the opposite end of the said male nut 31 is counterbored at 370, both counterbores 37 and 370 accommodating compressible annular washers or gaskets 38 and 3800 respectively, the said gasket 38 having a radially extending flange 380 extending therefrom which is disposed between the annular face 310 of the male nut 31 and the annular face 340 of the said coupling member 34. The portion of the annular washer or gasket 38 which fits into the counterbore 37 is slightly longer than the depth thereof and the length of the gasket 3800 is slightly longer than the depth of the counterbore 370.

The extreme end 350 of the tubular stem 35 of the coupling member 34 is flared or peened over after assembly to hold the swivel fitting 30 in assembled relationship and to initially compress the said compressible annular gaskets 38 and 3800 in the counterbores 37 and 370 respectively and to initially compress the radially extending flange 380 of the gasket 38 between the annular face 310 of the male nut 31 and the annular face 340 of the coupling member 34. The said initial compression of the said annular gaskets 38 and 3800 and the flanges 380 of the gasket 38 creates fluid-tight seals between the coupling member 34 and the male nut 31.

Although the hose coupling member 34 is indicated as employing an inner tubular member 40 within the interiorly threaded swedged shell 41 to prevent collapsing of the flexible hose 33 when the shell 41 of the coupling member 34 is swedged onto the said flexible hose 33, it is obvious that any type of coupling means other than that shown may be employed to connect the hose 33 to the coupling member 34.

Fluid under pressure within the fluid system to which the swivel fitting 30, the part 32, and the hose or the like 33 belong causes the hose coupling 34 and its tubular stem 35 to move in the direction indicated by the arrow 42 with respect to the male nut 31. Pressure on fluid from within the said fluid system which might force fluid out through minute spaces between the outer surface of the tubular stem 35 of the coupling member 34 and the bore 36 through the male nut 31 will tend to urge the compressible annular gasket 3800 out through the space between the male nut 31 and the peened over portion 350 of the stem 35 of the coupling member 34, however, inasmuch as the annular gasket 3800 is thicker than the space 3500 between the said peened over portion 350 of the coupling member 34 and the male nut 31, the said annular gasket 3800 cannot be forced by pressure out through the said space 3500, and, the greater the pressure within the fluid system, the more the movement of the hose coupling 34 and its tubular stem 35 in the direction indicated by the arrow 42 with respect to the male nut 31 and the tighter the wedging of the annular gasket 3800 in the counterbore 370, and the tighter the fluid seal accomplished thereby.

If the pressure within the fluid system to which the said swivel fitting 30, the part 32 and the hose or the like 33 belong is changed to vacuum, then the hose coupling 34 and its tubular stem 35 are urged in the direction indicated by the arrow 43 with respect to the male nut 31. This causes the annular faces 310 and 340 of the male nut 31 and the hose coupling 34 respectively to squeeze the radial flange 380 of the gasket 38 therebetween and form a tight seal thereat simultaneously with causing the annular portion of the said gasket 38 to be further compressed axially and expanded radially within the counterbore 370 in the male nut 31. The more the vacuum within the fluid system, the greater the squeezing of the flange 380 of the annular gasket 38, the greater the compression of the annular gasket 38, and the greater the fluid tightness of the fitting.

Accordingly, the embodiments of the invention provide simple effective swivel hose coupling means which have a fluid-tight seal against both pressure and vacuum.

Although but two embodiments of the invention have been disclosed and described herein, it is obvious that many changes in the size, shape, arrangement and detail of the various elements thereof may be made without departing from the spirit and scope of the invention as defined by the appended claims.

I claim:

1. In a swivel coupling including a coupling member having a tubular stem, a nut having an axial bore therein telescoped over said tubular stem, said nut having a counterbore in the end thereof adjacent the coupling member, said coupling member and said nut having oppositely disposed annular faces, an annular radially flanged gasket disposed in said counterbore and having its radial flange extending between said annular faces, the annular portion of said gasket being slightly longer than the depth of the counterbore in said nut, and means for holding said nut and annular radially flanged gasket in assembled relationship with respect to said coupling member simultaneously with initial deformation of said annular gasket within said counterbore.

2. In a swivel coupling including a coupling member having a tubular stem, a nut having an axial bore therein telescoped over said tubular stem, said nut having a counterbore in the end thereof adjacent the coupling member, the said coupling member having an annular counterbore therein axially opposite the counterbore in said nut, said coupling member and said nut having oppositely disposed annular faces, an annular gasket having a radial flange located inward of the ends thereof disposed in said counterbore and having its radial flange extending between said annular faces, the annular portions of said gasket being slightly longer than the depth of the counterbores in said nut and said coupling member, and means for holding said nut and annular radially flanged gasket in assembled relationship with respect to said coupling member simultaneously with initial deformation of said annular gasket within said counterbore.

3. In a swivel coupling including a coupling member having a tubular stem, a nut having an axial bore therein telescoped over said tubular stem, the said nut having counterbores therein at both ends thereof, said coupling member and said nut having oppositely disposed annular faces, an annular radially flanged gasket disposed in the counterbore adjacent the annular face of said coupling member and an annular gasket disposed in the other counterbore, the annular portion of the flanged gasket being slightly longer than the depth of the counterbore adjacent the annular face of said coupling member and the other gasket being slightly longer than the depth of the other counterbore, and means for holding said coupling member, said nut and said gaskets in assembled relationship simultaneously with initial deformation of said gaskets within said counterbores.

NORMAN M. COUTY.